June 19, 1923.

1,458,934

J. W. GUIMONT

METHOD OF WELDING RADIATORS

Filed Dec. 19, 1921

Inventor
J.W.Guimont
By
Attorney

Patented June 19, 1923.

1,458,934

UNITED STATES PATENT OFFICE.

JOSEPH WILLIAM GUIMONT, OF MONTREAL, QUEBEC, CANADA, ASSIGNOR OF ONE-HALF TO MENDOZA LANGLOIS, OF MONTREAL, QUEBEC, CANADA.

METHOD OF WELDING RADIATORS.

Application filed December 19, 1921. Serial No. 523,505.

*To all whom it may concern:*

Be it known that I, JOSEPH WILLIAM GUIMONT, a British subject, residing at 24 St. Antoine Street, in the city of Montreal, Prov. of Quebec, Dominion of Canada, have invented certain new and useful Improvements in Methods of Welding Radiators; and I do hereby declare that the following is a true, clear, and exact description of the same.

The present invention relates to improvements in the method of welding metal pieces such as radiators of the type described in my co-pending application, Serial No. 523,504, filed Dec. 19, 1921. The invention is fully described in the following description and illustrated in the accompanying drawings, in which:—

Like numerals of reference indicate corresponding parts in each figure.

Figure 1:
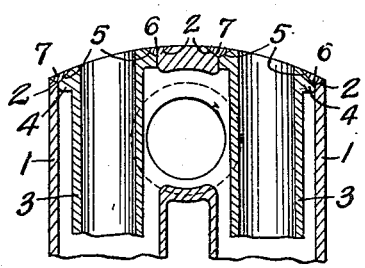
Figure 1 is a vertical sectional view through a portion of a radiator, section welded according to the invention.
Figure 2:
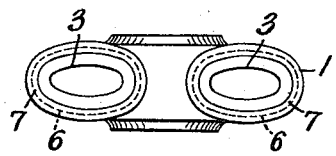
Figure 2 is an end view of Figure 1.

Referring to the drawings, 1 is the outer wall of a radiator section, the end to be welded being open and cut obliquely at 2; and 3 is an inner tube having at its end an integral outwardly extending flange 4 which preferably fits snugly on the inner side of the wall 1; the outer edge of said flange 4 being also obliquely cut at 5, so as to form a circumferential V shaped groove 6, when the tube 3 and the outer wall 1 are secured together.

In said V shaped groove 6, which may be of any other suitable shape, is poured melted metal 7, which fills in said groove and forms an exceptionally strong welding.

Any other suitable method of welding may be used to fill said groove 6, without, of course, departing from the spirit and scope of the invention.

What I claim as my invention is:—

The method of securing an inner tube in spaced relation with the outer casing of a radiator, which consists in forming at each end of said inner tube a straight sided annular shoulder, beveling the outer periphery of the end of each shoulder, internally beveling the inner periphery of the opening provided in the outer casing for the reception of the inner tube, so that when said tube is positioned in the casing an annular V-shaped groove is formed, and filling the said groove with molten metal in order to weld the walls together, the weld being flush with the ends of the inner tube and casing.

Signed at Montreal Quebec, Canada, this 2nd day of December 1921.

JOSEPH WILLIAM GUIMONT.

Witnesses:
C. PATENAUDE,
G. PÉLISSIER.